(12) United States Patent
Juzak et al.

(10) Patent No.: US 11,047,510 B2
(45) Date of Patent: Jun. 29, 2021

(54) PROFILED SECTION ELEMENT WITH STEPPED SIDEWALL

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V, Mijdrecht (NL)

( * ) Notice: Subject to any disclaimer, the term of this patent is extended or adjusted under 35 U.S.C. 154(b) by 0 days.

(21) Appl. No.: 16/733,648

(22) Filed: Jan. 3, 2020

(65) Prior Publication Data

US 2020/0224792 A1 Jul. 16, 2020

(30) Foreign Application Priority Data

Jan. 14, 2019 (NL) .................................... 2022397

(51) Int. Cl.
| | |
|---|---|
| *F16L 3/00* | (2006.01) |
| *B05B 15/62* | (2018.01) |
| *B05B 15/68* | (2018.01) |
| *F16L 3/24* | (2006.01) |
| *F16L 5/00* | (2006.01) |

(52) U.S. Cl.
CPC .............. *F16L 3/003* (2013.01); *B05B 15/62* (2018.02); *B05B 15/68* (2018.02); *F16L 3/24* (2013.01); *F16L 5/00* (2013.01)

(58) Field of Classification Search
None
See application file for complete search history.

(56) References Cited

U.S. PATENT DOCUMENTS

| | | | | |
|---|---|---|---|---|
| 8,104,726 | B2 * | 1/2012 | Hoernig ............... | A47K 17/022 248/220.22 |
| 8,721,012 | B2 * | 5/2014 | Chen ..................... | A47B 88/49 312/334.4 |
| 8,733,866 | B2 * | 5/2014 | Chen ..................... | A47B 88/40 312/334.4 |
| 9,022,326 | B2 | 5/2015 | Brown et al. | |
| 9,534,709 | B2 | 1/2017 | Wilson et al. | |
| 9,791,073 | B2 | 10/2017 | Witherbee | |
| 10,292,297 | B2 * | 5/2019 | Chen ................... | H05K 7/1489 |

(Continued)

FOREIGN PATENT DOCUMENTS

EP 0609973 8/1994

OTHER PUBLICATIONS

Search Report for NL 2022397 dated Sep. 18, 2019 (10 pages).

*Primary Examiner* — Steven M Marsh
(74) *Attorney, Agent, or Firm* — Tutunjian & Bitetto, P.C.

(57) ABSTRACT

An elongate profiled section element for a mounting system includes a bottom, a top section opposite the bottom, and sidewalls extending from the bottom to the top section. The top section includes two flanges which extend from the side walls and delimit between them a longitudinal slot. The top section has a smaller width than the bottom. At least one of the side walls is a stepped sidewall having a stepped shape seen in cross section. The stepped sidewall has two wall sections facing the opposite sidewall and an intermediate wall section substantially parallel to the bottom. The intermediate wall section is provided with a row of holes and the bottom is provided with a row of holes aligned therewith, said holes being adapted to cooperate with a self tapping screw.

8 Claims, 5 Drawing Sheets

(56) References Cited

U.S. PATENT DOCUMENTS

| | | |
|---|---|---|
| 10,765,207 B2 * | 9/2020 | Chen .................. A47B 88/43 |
| 2003/0005517 A1 | 1/2003 | Randolph |
| 2014/0263867 A1 | 9/2014 | Brown et al. |
| 2015/0159781 A1 | 6/2015 | Wilson et al. |
| 2016/0308342 A1 | 10/2016 | Witherbee et al. |
| 2017/0167636 A1 | 6/2017 | Witherbee |
| 2018/0062365 A1 | 3/2018 | Kellerman |

* cited by examiner

PROFILED SECTION ELEMENT WITH STEPPED SIDEWALL

BACKGROUND OF THE INVENTION

The invention relates to an elongate profiled section element for a mounting system, said profiled section element comprising a bottom, a top section opposite the bottom, and sidewalls extending from the bottom to the top section, wherein the top section comprises two flanges which extend from the side walls and delimit between them a longitudinal slot.

In certain building types at least interior walls are constructed as drywall including a stud construction. Such a construction includes a frame that is constituted by a floor framing member, a top framing member, and studs which are arranged in a parallel and spaced apart fashion and are attached to the top framing member and the bottom framing member. In many applications the stud frame is made of wood. The frame is covered with gypsum boards which are screwed to the studs. The gypsum boards may be finished with plaster.

It is known to mount an elongate profiled section element, as mentioned at the outset, between two studs to allow installation of in wall plumbing and electrical installation components such as electrical boxes, conduits for wiring etc. Such known elongate profiles are made of thin metal and generally have a C-shaped cross section. In general a pair of such profiles which are telescopically arranged, is provided. The length of the assembled profile elements can be easily adjusted by the telescoping assembly. In the bottom of the profiled section element a row of holes is provided for cooperation with fastening elements such as screws. Examples of such telescopically arranged elongate profile elements are disclosed in US 2018/0062365, U.S. Pat. Nos. 9,791,073, 9,022,326 and 9,534,709. Each profile of the pair of profiles has a mounting plate connected to one end of the bottom of the profiled section element, by which the profiled section element can be mounted to a stud in the drywall.

SUMMARY OF THE INVENTION

The invention relates to an elongate profiled section element for a mounting system. The profiled section element comprises a bottom, a top section opposite the bottom, and sidewalls extending from the bottom to the top section. The top section comprises two flanges which extend from the side walls and delimit between them a longitudinal slot. The top section has a smaller width than the bottom. At least one of the sidewalls is a stepped sidewall having a stepped shape seen in cross section, said stepped sidewall having two wall sections facing the opposite sidewall and an intermediate wall section substantially parallel to the bottom. The intermediate wall section is provided with a row of holes and the bottom is provided with a row of holes aligned therewith, said holes being adapted to cooperate with a self tapping screw.

In a possible embodiment of the profiled section element according to the invention the bottom is provided with a further row of holes which row faces the longitudinal slot.

In a possible embodiment of the profiled section element according to the invention the bottom is provided with a further row of holes which row faces the flange extending from the sidewall opposite the stepped sidewall.

In a possible embodiment of the profiled section element according to the invention a mounting plate provided with mounting holes is integrally formed on an end of the bottom.

The invention also relates to an assembly of two profiled section elements according to the invention, wherein one of the profiled section elements fits telecopically in the other one.

The invention furthermore relates to a stud wall structure wherein an assembly as mentioned above is mounted between two studs of the stud wall structure. In a possible embodiment of the stud wall a pipe fitting having mounting ears may be mounted to the bottom of the profiled section element by self tapping screws. Furthermore, a shower head may be fixed to the mentioned pipe fitting.

The invention will be further elucidated in the following detailed description with reference to the drawings.

DETAILED DESCRIPTION

Figure 1:
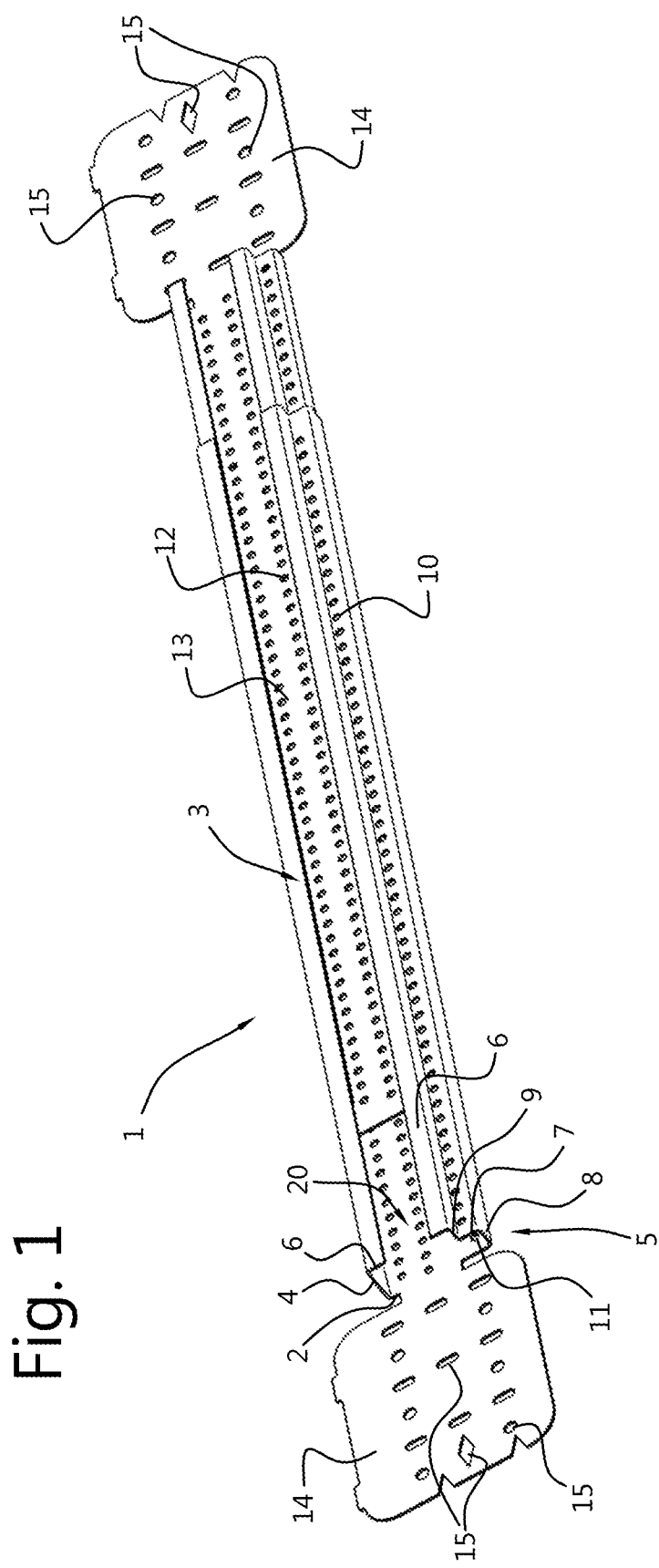
FIG. 1 shows in a view in perspective a pair of telescopically arranged profiled section elements according to the invention.
Figure 2:
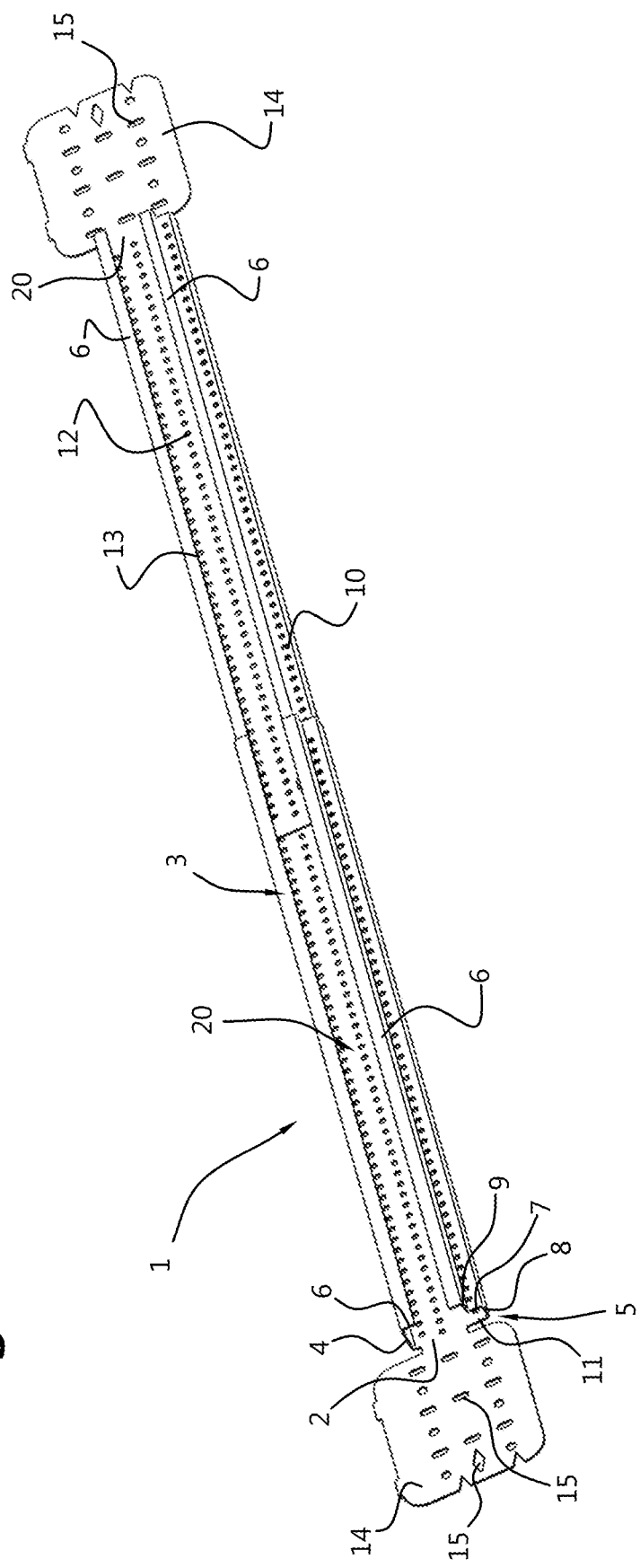
FIG. 2 shows in a view in perspective the pair of profiled section elements in a more extended state.
Figure 3:
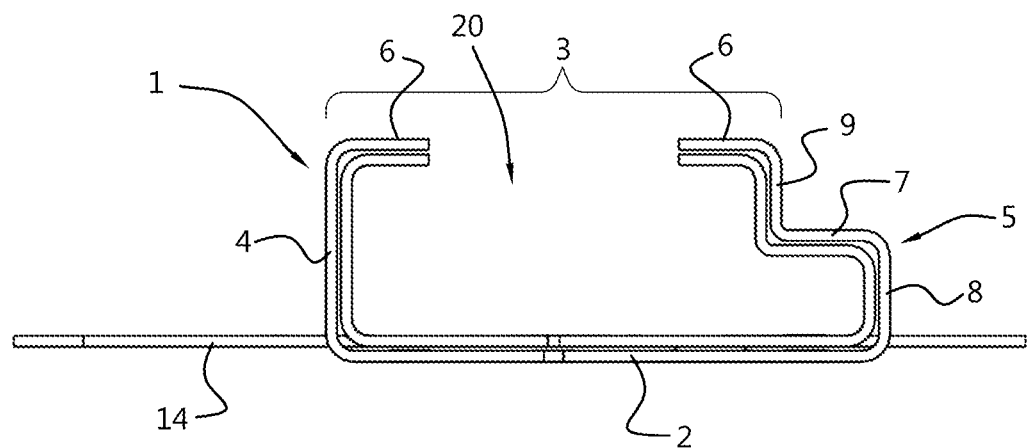
FIG. 3 shows a cross-section of the pair of telescopically arranged profiled section elements of FIG. 1.

FIGS. 1 and 2 show a pair of telescopically arranged elongate profiled section elements 1 in perspective. FIG. 1 shows the pair of profiled section elements 1 in a more slided-in state and FIG. 2 shows the pair in a more extended state. FIG. 3 shows the cross-section of the pair in a location where they overlap. The profiled section elements 1 are substantially the same, but one has a slightly smaller dimensions to fit slidingly in the other one to allow a telescoping assembly of the two profiles.

The profiled section element 1 comprises a bottom 2 and a top section 3 opposite the bottom 2. The top section 3 has a smaller width than the bottom 2. The top section includes two longitudinal flanges 6 and a longitudinal slot 20 between the flanges 6. This slot 20 may be used to fasten fastening units, such as well-known slidenut assemblies to the profiled section element as will be illustrated further below.

The profiled section element furthermore includes sidewalls 4 and 5 extending from the bottom 2 to the top section 3. The side wall 4 is straight and extends substantially perpendicular to the bottom 2 and the top section 3. The other side wall 5 has a stepped shape. The stepped sidewall 5 has two wall sections 8, 9 which are upstanding with respect to the bottom 2 of the profiled section element 1. In a preferred embodiment the two side wall sections 8 and 9 extend substantially parallel to the opposite sidewall 4. The stepped sidewall 5 furthermore includes an intermediate wall section 7 parallel to the bottom 2 interconnecting the upstanding wall sections 8 and 9.

Each profiled section element 1 comprises a mounting plate 14 on one end of the bottom 2. The mounting plate 14 is provided with a pattern of mounting holes 15. This mounting plate 14 is used to attach the respective profiled section elements 1 to, for example, the stud of a stud frame of a drywall. For this purpose, it may first be bent into another position at the joining line between the bottom 2 of the profiled section element 1 and the mounting plate 14, for example at a right angle relative to the bottom 2, but it can also be used in an in-line state in which plate is in line or flush with the bottom 2 of the profiled section element 1, as is shown in FIGS. 1 and 2. The two telescoping profiled section elements 1 can be moved with respect to each other, to adapt the length of the pair to fit between studs arranged at varying distances.

Rows of holes 10, 11, 12, 13 are formed in both profiled section elements 1 of the pair. The holes 10, 11, 12, 13 may be adapted to cooperate with a self-tapping screw. That is the holes are small and allow a screw tip to be inserted to initiate the screwing in of the screw. The hole will be cut and enlarged by the screw which is advanced. In the shown embodiment, the bottom has three rows of holes. The row of holes 11 faces the intermediate wall section 7 of the stepped sidewall 5. The row of holes 13 faces the flange 6 attached to the non-stepped sidewall 4. The row of holes 12 faces the longitudinal slot 20 between the flanges 6.

Additionally, the intermediate wall section 7 of the stepped sidewall is provided with a row of holes 10, wherein the holes 10 are aligned with the holes 11 in the bottom 2. Note that the invention also relates to elongated profiled section 1 which have less or more rows of holes, for example elongated profiled section 1 with only a row of holes 10 in the intermediate wall section 7 of the stepped sidewall 5 and a row of holes 11 aligned therewith in the bottom 2.

Figure 4A:
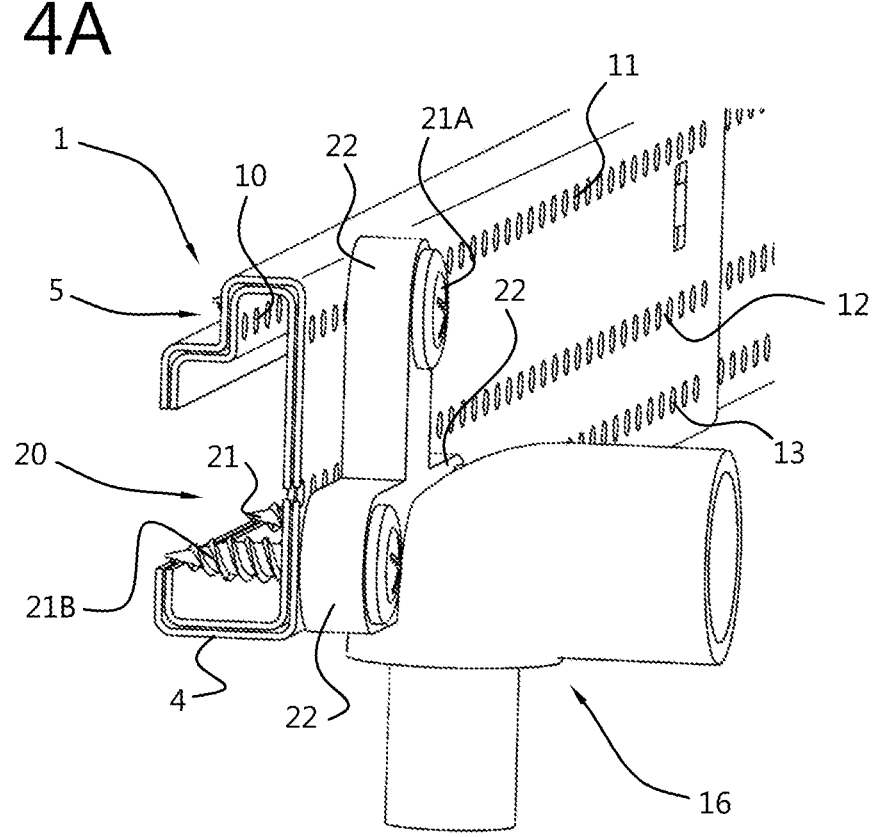
FIG. 4A shows a perspective view of a pipe connector attached to the profiled section element with three screws.
Figure 4B:
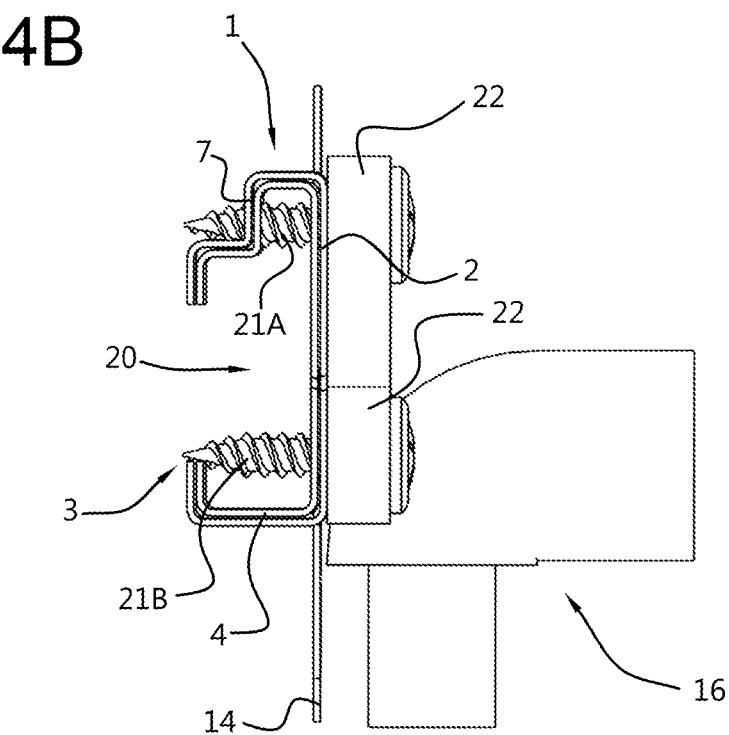
FIG. 4B shows a cross-sectional view of a pipe connector attached to the profiled section element with three screws.
Figure 5:
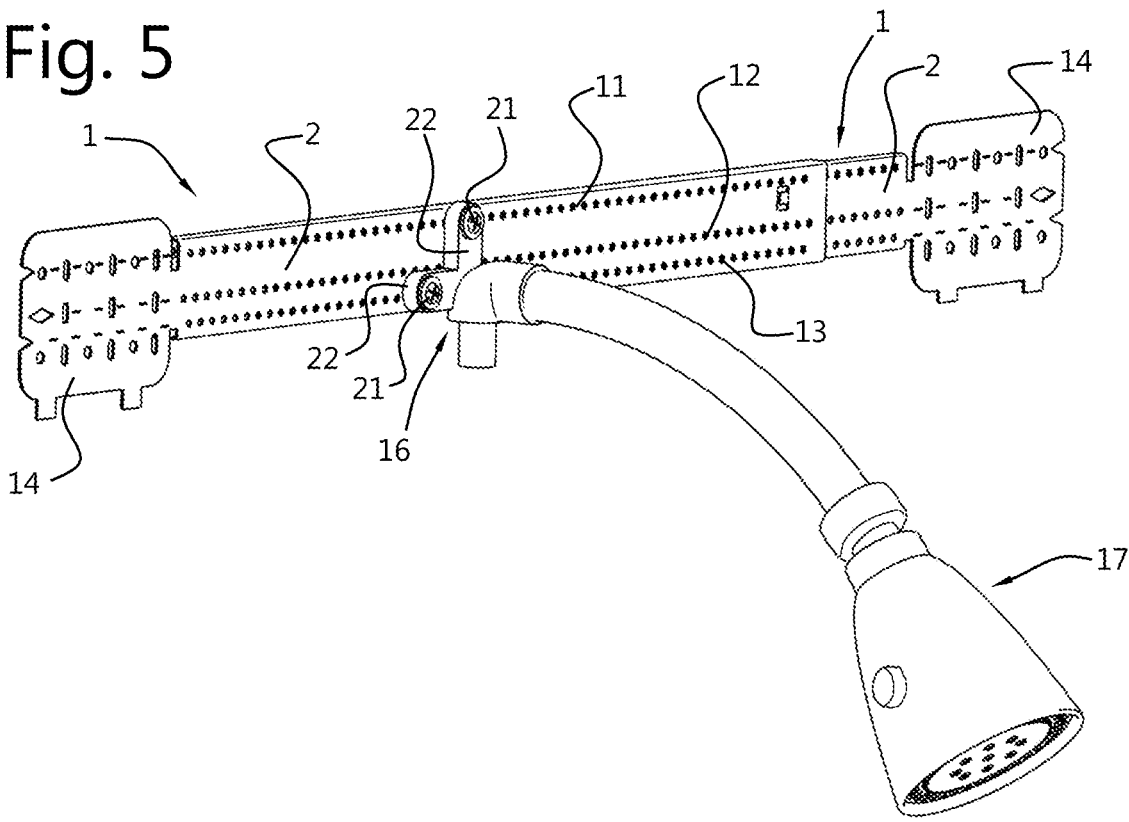
FIG. 5 shows in a view in perspective a shower head connected to the pipe connector of FIG. 4.

FIGS. 4A and 4B shows an example of how a plumbing component, in this case an elbow pipe fitting 16, may be attached to the elongate profiled section element 1. The pipe fitting 16 has three mounting ears 22 having a mounting hole for passing through fastening screws 21A, 21B. Three self-tapping screws 21A, 21B are used to fix the mounting ears 22 to the bottom 2 of the profiled section element 1, as is illustrated in FIGS. 4(*a*) and 4(*b*). It must be understood that the drop ear elbow fitting 16 shown in FIGS. 4A, 4B and 5 is only intended to be a non-limiting example of how a component may be attached to the profiled section elements 1.

The screw 21A is entered through two aligned holes 11, 10 in the bottom 2 and the intermediate wall section 7 of the stepped sidewall 5. The other two screws 21B are entered through holes 13 in the bottom 2 which face the flange on the side of the not-stepped sidewall 4. If the elbow 16 is attached on a location where the telescopically arranged profiled section elements 1 overlap, the first screw 21A passes through four layers of profiled section element material, which is preferably metal. The other two screws 21B cut and extend through two layers of profiled section element material, that is these screws extend through two overlapping bottoms 2. As can be best seen in FIGS. 4(*a*) and 4(*b*). If the fitting 16 is attached to a non-overlapping portion of one of the profiled section elements 1, the first screw 21A cuts and passes through to two layers, and the other screws 21B through one layer.

When mounting a similar element to a classic, C-shaped profiled section, all screws go through two layers in the overlapping region or one layer in the other regions. The extra layers of material made available by the stepped sidewall 5 according to the present invention allow a more sturdy fastening of parts to the profiled section element. This is, for example, very useful when a shower head 17 is attached to the pipe fitting 16, as is illustrated in FIG. 5.

While showering, a user will seek to direct the shower head 17, which causes forces on the fitting 16 inside the drywall. The sturdy fixation of the elbow provided by the profiled section elements 1 of the present invention is better able to resist the forces transferred by the shower head on the pipe fitting and the framing to which it is attached. The pipe fitting is maintained immobile on the frame during normal use.

Additionally, the insertion of the screws through more layers makes the construction more rigid against vibrations, because there is more pressure on the screws when they are inserted and thereby more resistance to coming undone.

Figure 6A:
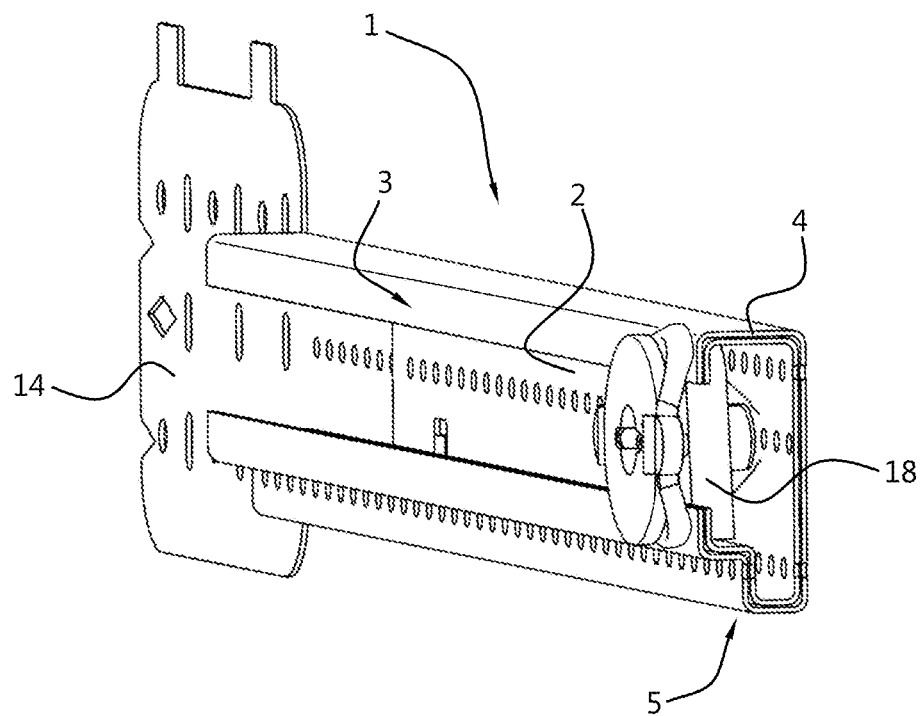
FIG. 6A is an exemplary illustration of how a slidenut fastener is connected to the profiled section elements.
Figure 6B:
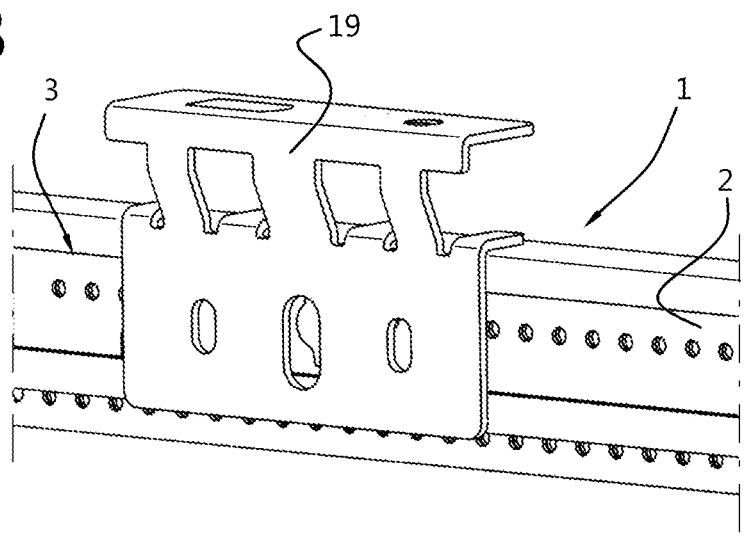
FIG. 6B is an exemplary illustration of how a rail attachment element is connected to the profiled section elements.

As mentioned in the above, the shape of the profiled section element 1 also allows products designed to be mounted on a classic, C-shaped profile section element to be mounted on the invention. The top section 3, comprising the longitudinal flanges 6 defining the longitudinal slot 20 between them, the non-stepped sidewall 4 and the upper wall section 9 of the stepped sidewall 5 constitute the shape, and preferably have the dimensions of an upper portion of a common C-shaped profiled section element. Thereby standard fastening components, such as slidenut fasteners can be used on the top section of the profiled section element 1, also in the overlapping regions of two telescopically arranged profiled section elements 1 as is illustrated in FIG. 6(*a*). FIG. 6(*b*) shows another example of a component that is designed to be mounted on a C-shaped mounting rail, can be mounted to the profiled section element 1 of the invention.

The invention claimed is:

1. An elongate profiled section element for a mounting system, said profiled section element comprising a bottom, a top section opposite the bottom, and sidewalls extending from the bottom to the top section, wherein the top section comprises two flanges which extend from the walls and delimit between them a longitudinal slot, wherein the top section has a smaller width than the bottom, wherein at least one of the side walls is a stepped sidewall having a stepped shape seen in cross section, said stepped sidewall having two wall sections facing the opposite sidewall and an intermediate wall section substantially parallel to the bottom, and wherein the intermediate wall section is provided with a row of holes and the bottom is provided with a row of holes aligned therewith, said holes being adapted to cooperate with a self tapping screw.

2. The profiled section element according to claim 1, wherein the bottom is provided with a further row of holes which row faces the longitudinal slot.

3. The profiled section element according to claim 1 wherein the bottom is provided with a further row of holes which row faces the flange extending from the sidewall opposite the stepped sidewall.

4. The profiled section element according to claim 1, wherein a mounting plate provided with mounting holes is integrally formed on an end of the bottom.

5. An assembly of two profiled section elements according to claim 1, wherein one of the profiled section elements fits telecopically in the other one.

6. A stud wall structure wherein the assembly of two profiled section elements according to claim 5 is mounted between two studs of the stud wall structure.

7. The stud wall structure of claim 6, wherein a pipe fitting having mounting ears is mounted to the bottom of the profiled section element by self tapping screws.

8. The stud wall structure of claim 7, wherein a shower head is fixed to the pipe fitting.

\* \* \* \* \*